May 3, 1955 W. W. PHARIS 2,707,727

SELECTOR FOR AUTOMATIC TELEPHONE SYSTEM PROVIDED WITH RESTRICTED LEVELS

Filed Dec. 8, 1951 3 Sheets-Sheet 1

INVENTOR.
WILLIAM W. PHARIS

BY T. L. Bowes

ATTORNEY

May 3, 1955 W. W. PHARIS 2,707,727

SELECTOR FOR AUTOMATIC TELEPHONE SYSTEM PROVIDED WITH RESTRICTED LEVELS

Filed Dec. 8, 1951 3 Sheets-Sheet 2

INVENTOR.
WILLIAM W. PHARIS

BY T. L. Bowes

ATTORNEY

May 3, 1955 W. W. PHARIS 2,707,727

SELECTOR FOR AUTOMATIC TELEPHONE SYSTEM PROVIDED WITH RESTRICTED LEVELS

Filed Dec. 8, 1951 3 Sheets-Sheet 3

INVENTOR.
WILLIAM W. PHARIS

BY J. L. Bowes

ATTORNEY

Patented May 3, 1955

2,707,727

SELECTOR FOR AUTOMATIC TELEPHONE SYSTEM PROVIDED WITH RESTRICTED LEVELS

William W. Pharis, Rochester, N. Y., assignor to Stromberg-Carlson Company, a corporation of New York Application December 8, 1951, Serial No. 260,736
7 Claims. (Cl. 179—18)

Figure 1:
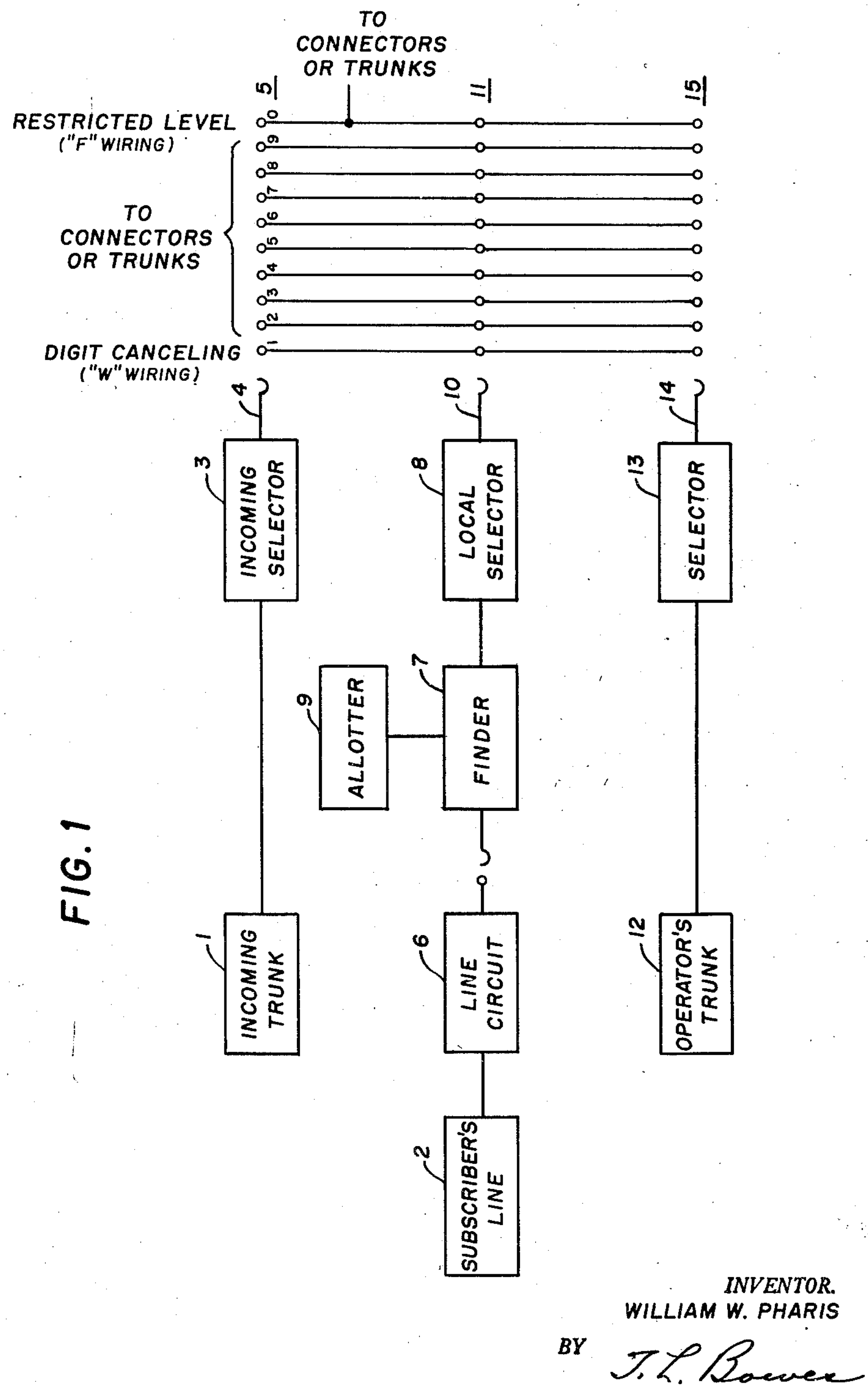

This invention relates to automatic telephone systems, and more particularly to means for restricting levels in selectors arranged for use in automatic telephone systems.

As is well known in the art, selector circuits are provided in automatic telephone systems as part of the switching train by which calls are extended from calling lines or trunks to called lines or trunks. The calling end may represent a local call or a toll call or an operator's operation, for example. Moreover, the calling line may involve different classes of service. In larger systems, local selectors and toll or incoming selectors may be needed in sufficient quantity to require their location in different parts of the exchange, but in smaller exchanges a space saving may be achieved by combining incoming and local selectors, for example, in a single frame and multiplying the selector banks. With such an arrangement it may be desirable to prevent access into a certain level or levels in some of the selectors but to permit access to that level or levels by other selectors in response to seizure by a calling line or trunk.

Therefore it is an object of my invention to provide a selector system in which one or more levels is restricted.

It is another object of my invention to provide an automatic telephone system embodying a plurality of selectors together with means for permitting access by a calling trunk through one of said selectors and for preventing access by that trunk through another of the selectors.

In accordance with my invention I have provided a system whereby an incoming trunk or calling line may be extended to one of a plurality of selectors. Each of these selectors is provided with a plurality of multipled levels of outlet contacts. Outgoing trunks are terminated at these outlet contacts. Apparatus is provided for permitting access by the incoming trunk or line through one of the selectors to the outlet contacts or terminals in a desired level of the multipled selectors and an additional arrangement is provided for preventing extension of a connection from the incoming trunk or line through one or more of the remaining selectors to the level of the seized selector which corresponds to the desired level.

My invention is particularly applicable to selectors employing step-by-step switches such as the XY switch, for example, in which there is employed a test or sleeve bank and wiper by means of which a busy test is made as the switch hunts through the directively determined level of the switch. A busy condition of the outgoing trunk is commonly determined by the presence of ground on the test contacts or terminals whereby the switch is caused to advance to the next contact.

In accordance with the principles of my invention, use is made of an auxiliary set of contacts which correspond to the switch levels and an auxiliary wiper which successively engages the auxiliary contacts as the main set of contacts moves in the primary or level selecting direction. I connect each auxiliary contact which corresponds to a level to be restricted to the test wiper of the selector switch and provide circuit means for applying ground to the auxiliary wiper. As a result of this circuit arrangement, a busy condition is simulated at each position within the restricted level.

When a plurality of selectors are multipled together, access to outgoing trunks in a given level thereby depends upon whether the auxiliary contacts or terminals of that particular level are connected to the test wiper. If that connection is made, the seized selector will advance through the selected level until the overflow position is reached, but if the busy-simulating connection is not made in the particular selector which has been seized, access to that level is not restricted and extension of a call through this selector will depend entirely on whether or not there are any available idle outgoing trunks.

Figure 2:
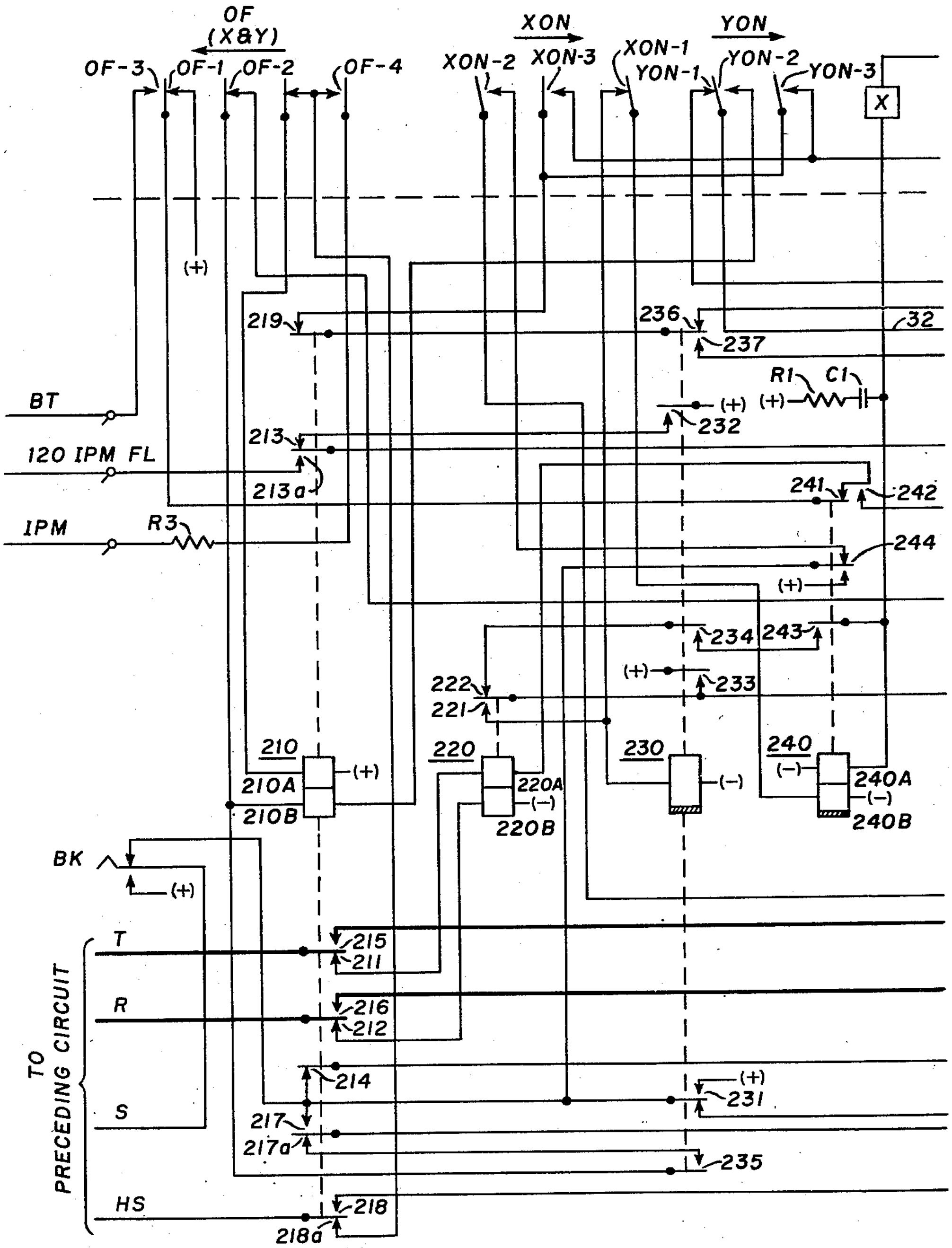
Figure 3:
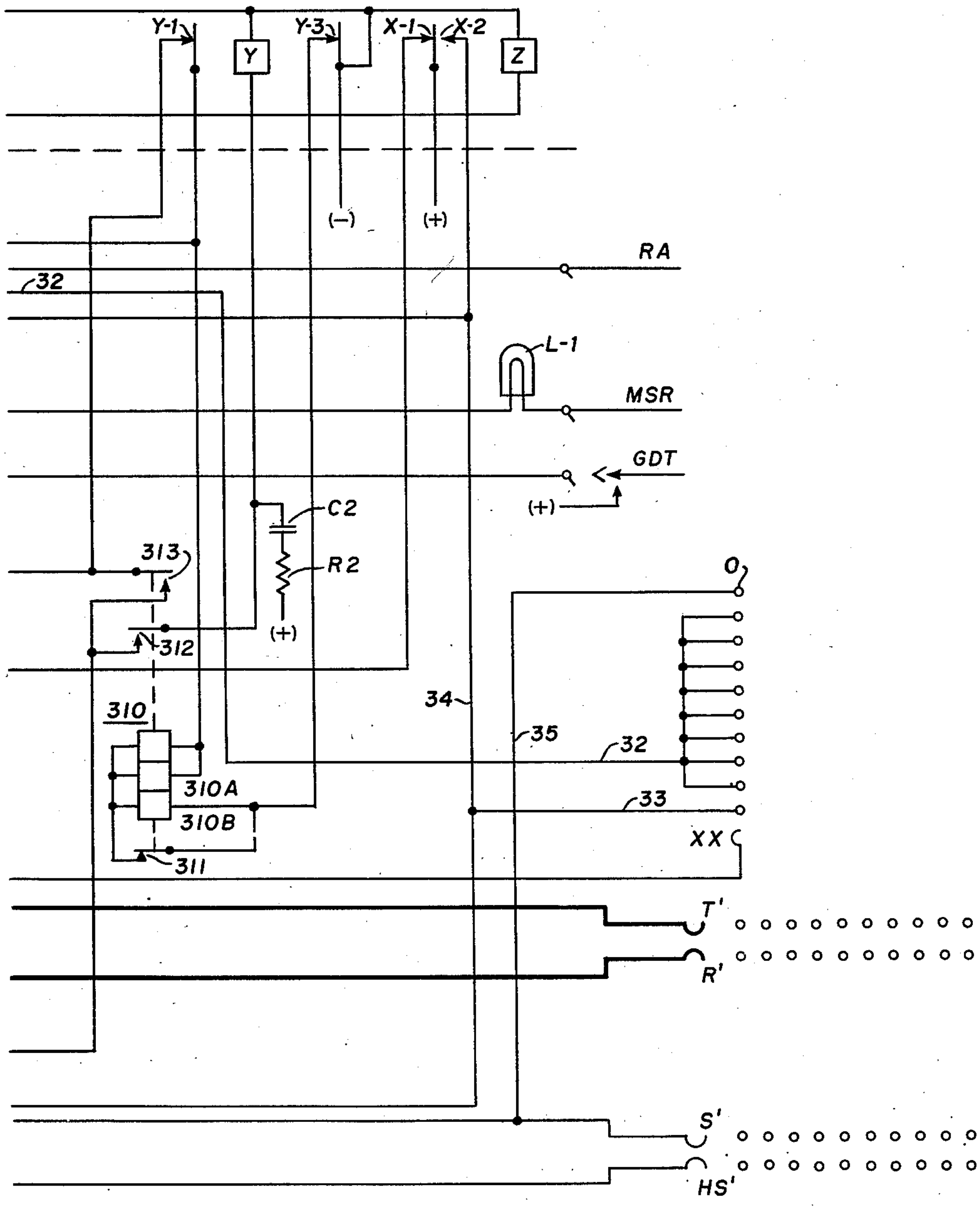

Further objects and advantages of my invention may best be understood by referring to the following description taken in connection with the accompanying drawing in which Fig. 1 is a block diagram illustrating a system embodying the principles of my invention, and Figs. 2 and 3 illustrate the circuit arrangement of one of the selectors shown in Fig. 1 equipped for level restriction.

Referring to Fig. 1, there is shown an incoming trunk 1 and a subscriber's line 2. Of course it is understood that the disclosure in the drawings may include as many trunks and lines as desired but for purposes of simplification only one of each is shown. Incoming trunk 1 is illustrated as being connected to an incoming selector 3 having a step-by-step switch. It is understood that the step-by-step switch included as part of incoming selector 3 is equipped with a main set of wipers including at least tip, ring and sleeve wipers. It is understood that selector 3 also includes an auxiliary wiper 4 arranged to successively engage a set of auxiliary contacts or terminals indicated by the numeral 5. As indicated previously, the auxiliary wiper 4 is arranged to move only during the primary movement of the main set of wipers and the contacts or terminals 5 correspond to the levels of the selector switch. Thus if the main set of wipers or brushes is stepped to the fifth level, for example, the auxiliary wiper 4 engages the fifth contact in the auxiliary set of contacts 5.

There is also shown in Fig. 1 the termination of subscriber's line 2 in a suitable line circuit 6. A plurality of finders, one of which is indicated by the numeral 7, is provided for seeking the calling line and for extending the call upon seizure to a local selector 8. As indicated in Fig. 1 there is also provided a suitable allotter 9 for allotting the finders to respond to calling conditions on the subscriber lines. Local selector 8 is similar to incoming selector 3 and is provided with a main set of wipers and banks (not shown) as well as an auxiliary wiper 10 and a set of auxiliary contacts 11 corresponding to the levels of the switch associated with selector 8.

There is also represented an operator's trunk 12 having access through selector 13 and auxiliary wiper 14 to another set of auxiliary contacts 15.

The sets of auxiliary contacts 5, 11 and 15 as well as any other sets of auxiliary contacts associated with additional selectors are multipled together as shown. While the tenth level terminates an outgoing trunk, this level is restricted in regard to incoming selectors 3. As indicated in Fig. 3, this contact is connected within the selector to the test wiper S'. The local selector 8, however, is not provided with a restricted level and hence all contacts in contact set 11 terminate outgoing trunks. By the term "outgoing trunks" it is meant that a call may be extended from the seized selector to a connector or to a trunk circuit.

Thus if incoming selector 3 is seized and the tenth level 0 is dialed, the call will not be cut through if levels 1 to 9 are dialed the incoming selector 3 is permitted to hunt through the selected level for an idle connection. However, if either selector 8 or selector 13 is seized the call may be extended through all ten levels.

Reference is next made to Figs. 2 and 3 for a detailed description of the operation of selector 3. In the drawings, the battery designations (+) and (−) are used and hereinafter the expression "battery" will indicate the negative terminal of the battery and the (+) symbol will indicate the positive terminal of the battery and it is to be understood that the positive terminal of the battery is also connected to ground so that the use of the word "ground" is indicative of a connection not only to ground but also to the positive terminal of the station battery.

Assuming that the previous switching equipment such as a line finder, selector, or trunk has been extended to the tip, ring, sleeve and hunt leads T, R, S and HS respectively, a circuit is completed for operating the calling bridge relay 220 over a loop extending from ground appearing on the normal contacts OF–1 of the overflow pile-up OF through normal contacts 241, winding 220A, normal contacts 211, tip lead T, calling loop, ring lead R, normal contacts 212 and winding 220B to battery. In response to the operation of relay 220, the delay relay 230 and the X-delay relay 240 are energized in parallel over circuits extending from ground appearing on the normal contacts Z–1 of release magnet Z through operated contacts 221 and winding of relay 230 to battery and from ground through normal contacts Z–1, operated contacts 221, normal contacts XON–1 of the X off-normal pile-up XON and through winding 240B to battery, respectively.

The operation of delay relay 230 effects the application of ground to the back sleeve lead S through operated contacts 231 and busy key BK. The operation of relay 230 also extends ground through operated contacts 232 and normal contacts 213 to the monitor-supervisory lead MSR including the lamp L–1.

If it is desired to furnish dial tone from the selector of Figs. 2 and 3, the dial tone lead DT, Fig. 3, is connected to the tip side of the line through conductor 31, operated contacts 242, winding 200A of relay 220 and normal contacts 211. With this arrangement, dial tone is removed when X-delay relay 240 releases at the conclusion of the first digit. If dial tone is not provided through the selector of Figs. 2 and 3, conductor 31 is connected directly to ground instead of to dial tone lead DT so that upon the operation of relay 240 the operating ground for the calling bridge relay 220 applied through normal contacts 241 is now applied to winding 220A through operated contacts 242.

When the calling party dials the first digit, the loop applied to the calling bridge relay 220 is interrupted according to the digit dialed and relay 220 pulses. Upon each closure of normal contacts 222, ground by way of operated contacts 233 is applied through normal contacts 222, operated contacts 234 and 243, and the primary direction magnet X to battery, resulting in the stepping of the switch SS*w* in the primary direction.

As previously indicated, switch SS*w* is preferably of the step-by-step type and, for example, may be of the so-called XY type in which the main set of wipers move in a single plane, the secondary or Y movement being at right angles to the primary or X movement. The switch shown in the drawings comprises a main set of wipers including four wipers or brushes designated as tip, T′, ring, R′, sleeve, S′ and hunt HS′, respectively. As is understood by those skilled in the art, the XY switch also has an auxiliary set of brushes and contacts so arranged that the auxiliary brush identified in Fig. 3 as the XX wiper moves in the Y direction during the primary movement of the main set of wipers, i. e., the XX wiper moves in the Y direction while the main set of wipers is moving in the X direction. This is indicated in the drawing by the relative positions of the wipers and contacts. The switch also includes a set of overflow switches OF, off-normal switches XON which are operated when the switch moves in the primary or X direction and a second set of off-normal springs YON which operate when the switch takes its first step in the Y direction. The switch also includes primary and secondary direction magnets, X and Y, respectively, and a release magnet Z.

Referring back now, to the energization of the stepping magnet X, the main set of wipers has been moved one step in the X direction and the auxiliary brush XX has moved one step in the secondary direction into engagement with the first contact in the XX bank. It is noted at this point that both delay relays 230 and 240 are provided with slow-to-release characteristics so that both of these relays hold operated over the train of dial pulses referred to above.

When the switch SS*w* takes the first step in the X direction, the X off-normal contact springs XON operate and thereby de-energize winding 240B at now open contacts XON–1 but relay 240 holds operated until the last impulse has been received over a circuit extending from battery through winding 240A, operated contacts 243 and 234, normal contacts 222 and operated contacts 233. Thus, relay 240 holds operated over the pulsing ground through the pulsing contacts 222 of the calling bridge relay 220.

As indicated in Fig. 1, the switch SS*w* is arranged for digit canceling on level 1 and is arranged for restricted service on level 0 but may be used to connect to succeeding connectors or trunks through each of levels 2 to 9 inclusive.

Let it be assumed that the dialed digit drives the switch SS*w* to any of the levels except 1 or 0, as level 3 for example. Under the assumed condition, relay 240 releases at the end of the delay period following the conclusion of the dialed digit at which time ground on operated contacts 231 of relay 230 (relay 230 remaining energized through operated contacts 233 and now closed contacts 221) is conducted through normal contacts 244, operated off-normal contacts XON–2, XX brush or wiper, XX contact 3, normal contacts YON–1 of the Y off-normal springs, winding 310A of hunt relay 310, normal contacts 311 and normal contacts Z–3 of the release magnet Z to battery.

The foregoing circuit operates relay 310 to close a path for operating the stepping magnet Y over a circuit extending from battery through magnet Y, operated contacts 312, normal contacts 214 and operated contacts 231 to ground. This circuit energizes stepping magnet Y and causes switch SS*w* to move one step in the secondary or Y direction into the third level of the bank of contacts or terminals.

At this point it should be noted that upon the operation of relay 310 that relay is locked up from ground on operated contacts 231 through normal contacts 214, operated contacts 313, Y interrupter springs Y–1 to winding 310A. Thus, relay 310 is held operated until the stepping magnet Y operates to open the interrupter springs Y–1.

As the switch advances in the Y direction, the sleeve or test wiper S′ is employed to make the usual busy test. Means (not shown) is provided for applying a desired potential, usually ground, upon the sleeve bank terminals or contacts in the sleeve banks to indicate a busy condition of the line or trunk terminating at that contact or terminal. If the first sleeve or test contact is not marked as busy, a circuit is completed for operating the switching relay 210 to extend the back tip and ring leads T and R to the tip and ring brushes T′ and R′ respectively, in order to extend the call to the succeeding equipment. For this purpose ground is forwarded from operated contacts 231 through normal contacts 244, operated contacts XON–2, XX brush or wiper, contact 3 in the XX bank, conductor 32, operated contacts YON–2, winding 210B of switching relay 210, normal contacts OF–2 of the overflow pile-up OF, Y interrupter Y–1, windings 310A and 310B in series, through release switch contacts Z–3 to battery. Relay 210 operates from the resulting current flow over the above described path but relay 310 does not operate because that relay is not designed to operate on the relatively low current now flowing.

Operation of relay 210 extends the tip and ring leads T and R to the tip and ring brushes T′ and R′, respectively, at operated contacts 215 and 216 respectively. The sleeve lead S is extended to the sleeve or test wiper S′ at operated contacts 217, and the hunt lead HS is extended to the hunt wiper HS′ through operated contacts 218. The circuit for maintaining relay 220 is thus broken at contacts 211 and 212 and the resulting release of relay 220 de-energizes relay 230 at now open contacts 221 and, after a time delay, relay 230 releases.

The foregoing discussion related to the test brush S′ encountering an idle outlet contact. It may now be assumed that the test wiper S′ encounters a busy outlet or contact as indicated by the presence of ground on the first test contact. Ground appears on the sleeve wiper S′ and ground is conducted through normal contacts 217*a* and operated contacts 235 to winding 210B of relay 210. Inasmuch as the other terminal of winding 210B is connected to ground through off-normal springs YON–2, conductor 32, XX contact and brush, off-normal contacts XON–2, normal contacts 244 and operated contacts 231, relay 210 is shunted down by the presence of ground on both sides of the coil. Therefore the switching relay 210 cannot operate. This sleeve ground indicative of a busy condition is also conducted through overflow springs OF–2 and interrupter contacts Y–1, to the operating winding 310A in order to reoperate relay 310.

Upon the reoperation of relay 310, stepping magnet Y is again operated from ground by way of operated contacts 312 so that the magnet Y receives another pulse to advance the switch to the second position in the third level. In order to assure that the magnet Y will operate and that switching relay 210 will remain shunted until the next contact in the level is reached, ground on operated contacts 231 is forwarded through normal contacts 214, operated contacts 313, interrupter contacts Y–1 to relay winding 310A and thence to battery by way of normal contacts 311 and contacts Z–3, thereby holding operated relay 310. At the next test contact, the foregoing busy test is repeated. If the outlet is idle the selector is switched through but if the outlet is busy the selector continues to hunt until an idle outlet is found. If all outlets are busy the switch steps into the Y overflow position, thereby operating the overflow pile-up OF. Operation of the overflow springs is utilized to prevent further operation of relay 310 because of the opening of its operating circuit at contacts OF–2.

Busy tone is forwarded from the busy tone lead BT through operated overflow contacts OF–3, normal contacts 241, winding 220A, normal contacts 211 and tip lead T to the calling line or incoming trunk, thereby informing the calling party that all levels are busy. A flashing battery may be applied to the hunt lead HS in the overflow position of the switch by way of normal contacts 218*a*, overflow contacts OF–4 and impulsing lead IPM in order to provide operator's supervision.

Assuming that the succeeding circuit is seized, ground is returned on the front sleeve in any suitable manner by way of test wiper S′ through operated contacts 217, normal contacts 244, operated contacts XON–2, XX brush, auxiliary contact 3, conductor 32, operated off-normal contacts YON–2 to relay winding 210B in order to hold relay 210 operated.

The circuit of Figs. 2 and 3 is released upon the removal of ground in the succeeding circuit as by hanging up by the called party. Release of relay 210 effects energization of release magnet Z from ground (not shown) on lead RA through normal contacts 236 and 219, operated contacts XON–3 and YON–3 in parallel through the release magnet Z to battery.

*Digit canceling*

If digit canceling is required, conductor 33 is provided. In the arrangement shown in Fig. 3, conductor 33 terminates the auxiliary contact 1 of the XX bank. The circuit operation is similar to that previously described during the pulsing of relay 220. However, at the conclusion of the first digit when relay 240 releases, ground forwarded to the XX brush by way of off-normal contacts XON–2, normal contacts 244 and operated contacts 231 is conducted by way of conductors 33 and 34 through operated contacts 237, normal contacts 219 and operated contacts XON–3 to the release magnet Z, thereby operating the release magnet to restore the switch to normal.

*Level restriction*

In accordance with my invention, the selector of Figs. 2 and 3 is also arranged so that access through the selector shown in Figs. 2 and 3 cannot be had in the tenth level 0. On the contrary, the circuit arrangement is such that the tenth contact 0 is directly connected to the test wiper S′ as by means of conductor 35. It will be recalled that a source of potential, i. e. station battery, is provided in order to operate the exchange of which the selector shown in Figs. 2 and 3 is a part and that a predetermined value of that potential is utilized as a busy indication. It has heretofore been assumed that that potential is "ground." In the illustrated form of my invention, therefore, ground is forwarded from contacts 231, through normal contacts 244, operated contacts XON–2, auxiliary wiper XX and XX bank contact 0 corresponding to the tenth level of switch SS*w* to the sleeve or test wiper S′. Since the switch is stepped forward each time test wiper S′ encounters ground, it will be understood that a busy condition is simulated throughout the Y movement of switch SS*w* in the tenth level by reason of the strapping of ground by way of conductor 35 to the test wiper S′.

Thus, assuming that the incoming dial pulses cause the switch to be stepped in the primary or X direction to the tenth level, ground is applied to the test wiper S′ over a circuit extending from ground on operated contacts 231 through normal contacts 244, off-normal contacts XON–2, to the XX wiper. Thus the foregoing ground is applied through normal contacts 217A, operated contacts 235, normal overflow contacts OF–2 and interrupter contacts Y–1 to operate winding 310 of hunt assist relay 310 and thence by way of normal contacts 311 and Y–3 to battery. It will be understood that the operation of relay 310 causes energization and operation of the magnet Y and since battery remains on the wiper S′, relay 310 and magnet Y interact to drive the switch SS*w* to the overflow position, and as previously described, busy tone is then forwarded from busy tone lead BT through operated overflow contacts OF–3, normal contacts 241, winding 220A and normal contacts 211 to the tip lead T and the calling line or trunk.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system comprising calling lines; a plurality of trunks; means including a switch for extending a connection between one of said calling lines and one of said trunks; said switch having primary and secondary stepping movements, a test wiper positioned according to both of said movements, a plurality of levels of contacts terminating said trunks, the contacts of each level being disposed for successive engagement by said test wiper, an auxiliary brush positioned responsive to said primary movement only, and a plurality of auxiliary contacts disposed for successive engagement by said auxiliary brush and corresponding to said levels of contacts; means utilizing said test wiper for determining the idle or busy condition of said trunks; and means for restricting access to one or more of said levels; the improvement wherein said restricting means includes means responsive to the positioning of said auxiliary wiper on the auxiliary terminal corresponding to the level or levels to be restricted for simulating a busy condition throughout said restricted level.

2. In a telephone system comprising calling lines; a plurality of trunks; means including a switch for extending a connection between one of said calling lines and one of said trunks; said switch having primary and secondary stepping movements, a test wiper positioned according to both of said movements, a plurality of levels of contacts terminating said trunks, the contacts of each level being disposed for successive engagement by said test wiper, an auxiliary brush positioned responsive to said primary movement only, and a plurality of auxiliary contacts disposed for successive engagement by said auxiliary brush and corresponding to said levels of contacts; means utilizing said test wiper and the presence of a predetermined potential on test contacts corresponding to busy trunks for determining the busy condition of a given trunk; and means for restricting access to a predetermined level; the improvement wherein said means comprises an electrical connection between the auxiliary contact corresponding to said predetermined level and said test wiper and an electrical connection between said auxiliary wiper and a source of said predetermined potential whereby a busy condition is simulated throughout said predetermined level.

3. In a telephone system comprising calling lines; a plurality of trunks; means including a switch for extending a connection between one of said calling lines and one of said trunks; said switch having primary and secondary stepping movements, a test wiper positioned according to both of said movements, a plurality of levels of contacts terminating said trunks, the contacts of each level being disposed for successive engagement by said test wiper, an auxiliary brush positioned responsive to said primary movement only, and a plurality of auxiliary contacts disposed for successive engagement by said auxiliary brush and corresponding to said levels of contacts; means utilizing said test wiper and the presence of a predetermined potential on test contacts corresponding to busy trunks for determining the busy condition of a given trunk; and means for restricting access to a predetermined level; the improvement wherein said restricting means comprises an electrical connection between the auxiliary contact corresponding to said predetermined level and said test wiper and an electrical connection between said auxiliary wiper and a source of said predetermined potential whereby a busy condition is simulated throughout said predetermined level and said switch is advanced to its overflow position.

4. In a telephone system comprising calling lines; a plurality of trunks; means including a switch for extending a connection between one of said calling lines and one of said trunks; said switch having primary and secondary stepping movements, a test wiper positioned according to both of said movements, a plurality of levels of contacts terminating said trunks, the contacts of each level being disposed for succesive engagement by said test wiper, an auxiliary brush positioned responsive to said primary movement only, and a plurality of auxiliary contacts disposed for successive engagement by said auxiliary brush and corresponding to said levels of contacts; means utilizing said test wiper and the presence of a predetermined potential on test contacts corresponding to busy trunks for determining the busy condition of a given trunk; and means for restricting access to a predetermined level; the improvement wherein said restricting means comprises an electrical connection between the auxiliary contact corresponding to said predetermined level and said test wiper and an electrical connection between said auxiliary wiper and a source of said predetermined potential whereby a busy condition is simulated throughout said predetermined level; and means whereby busy tone is returned to the calling line at each contact in said predetermined level.

5. In a telephone system comprising calling lines; a plurality of trunks; means including a switch for extending a connection between one of said calling lines and one of said trunks; said switch having primary and secondary stepping movements, a test wiper positioned according to both of said movements, a plurality of levels of contacts terminating said trunks, the contacts of each level being disposed for successive engagement by said test wiper, an auxiliary brush positioned responsive to said primary movement only, a plurality of auxiliary contacts disposed for successive engagement by said auxiliary brush and corresponding to said levels of contacts; means utilizing said test wiper and the presence of a predetermined potential on test contacts corresponding to busy trunks for determining the busy condition of a given trunk; and means for restricting access to a predetermined level; the improvement wherein said restricting means comprises an electrical connection between the auxiliary contact corresponding to said predetermined level and said test wiper and an electrical connection between said auxiliary wiper and a source of said predetermined potential whereby a busy condition is simulated throughout said predetermined level, and said switch is advanced to its overflow position, and means to return busy tone to the calling line at each contact in said predetermined level.

6. In a telephone system comprising calling lines; a plurality of trunks; means including a switch for extending a connection between one of said calling lines and one of said trunks; said switch having primary and secondary stepping movements, a test wiper positioned according to both of said movements, a plurality of levels of contacts terminating said trunks, the contacts of each level being disposed for successive engagement by said test wiper, an auxiliary brush positioned responsive to said primary movement only, and a plurality of auxiliary contacts disposed for successive engagement by said auxiliary brush and corresponding to said levels of contacts; means utilizing said test wiper and the presence of ground on the test contacts corresponding to busy trunks for indicating a busy condition of the corresponding trunk and for advancing said switch, means for connecting said auxiliary wiper to ground, and means for connecting said test wiper to said auxiliary contact corresponding to one of said levels, whereby said test wiper is connected to ground and said switch is advanced in its secondary movement to overflow whenever said switch is previously advanced in its primary movement to said one of said levels corresponding to said grounded auxiliary contact.

7. In a telephone system, incoming trunks of one or more classes, a selector associated with each of said trunks, local lines, local selectors available to said local lines, each of said selectors having a plurality of multipled levels of outlet contacts and test contacts as well as outlet wipers and a test wiper for successive engagement with said outlet and test contacts respectively, an outgoing trunk terminating in one of said levels, a source of potential, means for applying a desired potential from said source to the test contacts corresponding to said outgoing trunk in the respective levels when said outgoing trunk is busy, each of said selectors also having an auxiliary wiper and auxiliary contacts corresponding to said levels, the auxiliary contact of one or more of said selectors corresponding to said one level being connected to said test wiper, and means for connecting said auxiliary wiper of only said one or more selectors to said desired potential whereby seizure of said one or more selectors is effective to prevent a connection between said trunks but seizure of any of the remaining selectors is effective to extend a connection between said trunks.

References Cited in the file of this patent

UNITED STATES PATENTS

| | | |
|---|---|---|
| 1,492,995 | Lubberger | May 6, 1924 |
| 1,649,494 | Smith | Nov. 15, 1927 |
| 2,271,878 | Wadsworth | Feb. 3, 1942 |
| 2,592,784 | Bakker | Apr. 15, 1952 |
| 2,642,498 | Riddell et al. | June 16, 1953 |